United States Patent Office

3,089,856
Patented May 14, 1963

3,089,856
PRODUCTION OF CONDUCTIVE ZINC OXIDE
Howard M. Cyr and Nicholas S. Nanovic, Palmerton, Pa., assignors to The New Jersey Zinc Company, New York, N.Y., a corporation of New Jersey
No Drawing. Filed Nov. 10, 1960, Ser. No. 68,332
2 Claims. (Cl. 252—518)

This invention relates to the production of electrically conductive zinc oxide. More particularly, it comprises an improvement in a previously developed method of converting normally non-conductive zinc oxide to a conductive form.

Electrically conductive zinc oxide is required as a coating for paper used in electro-photographic reproduction, and the United States patent to Dalton No. 2,887,632 describes a representative procedure for converting the normally non-conductive oxide to a conductive form. This procedure involves the addition of an activating agent to the non-conductive oxide and the subsequent heating of the thus-treated oxide in a reducing atmosphere. Although the final product has the desired electrical conductivity, the heat treatment results in oxide particle size growth such as to detract from the normal attributes of zinc oxide as a coating pigment. Mechanical disintegration of the heat-treated conductive oxide to overcome the adverse effects of particle size growth and agglomeration has simultaneously lowered its conductivity.

We have now discovered that the pigment benefication of mechanical disintegration can be realized in such a method of imparting electrical conductivity to zinc oxide if a major portion of the heat treatment of the activator-containing oxide is first carried out in the ambient atmosphere and if mechanical disintegration follows this heat treatment but precedes the ultimate requisite heating of the oxide in a reducing atmosphere. Thus, our invention comprises an improvement in the method of producing electrically conductive zinc oxide wherein an activating agent is added to normally non-conductive zinc oxide and the activator-containing oxide is heated in a reducing atmosphere to a temperature of at least about 800° C. with resulting increase in its conductivity. Our improvement in this method comprises first heating the activator-containing non-conductive zinc oxide in the ambient atmosphere to a temperature of at least about 650° C., subjecting this air-heated oxide to mechanical disintegration wherein any agglomerates are broken, and thereafter subjecting the disintegrated oxide to the aforementioned heat treatment in the reducing atmosphere.

The normally non-conductive zinc oxides which respond to the method of our invention include both American Process oxide, made directly from zinc ore, and French Process oxide, made directly from zinc metal.

The activators which are useful in practicing our invention are those already known for their ability to impart electrical conductivity to zinc oxide when the activator-containing oxide is heated in a reducing atmosphere. These activators generally comprise aluminum and indium metallo-organic and metallo-inorganic compounds such as the acetates, formates, sulphates, nitrates, chlorides, and the like. All such activators, if effective in the method of the prior art, are at least equally effective, and in many instances more effective, when used in the method of our invention.

The activator may be applied to the zinc oxide by any procedure which will result in effective distribution of the activator throughout the mass of oxide. For example, we have found that low cost and simplicity characterize application of a solution of the activator in the form of a spray. Greater uniformity of dissemination of the activator in the oxide is obtained by slurrying the oxide in water and by adding the activator either in the solid form or in solution form. When the oxide is slurried for addition of the activator, the final mixture is filtered, washed and dried before being further treated.

The effective amounts of activator are generally within the range of about 0.1 to 1% of the metallic constituent of the activator by weight of the zinc oxide, and are preferably within the range of 0.3 to 0.5%. Within this preferred range, the conductivity of the final product is substantially uniform, and variations from this degree of conductivity are not significant until the amount of activator is below or above the generally effective range of 0.1 to 1%. However, the uniformity of application of the activator to the oxide does affect the utilization of the activator with the result that smaller amounts of activator are more effective when they are more uniformly distributed through the zinc oxide than larger amounts of activator which are less uniformly distributed.

The activator-containing zinc oxide is heated in the ambient atmosphere to an oxide temperature of at least about 650° C. The length of time reuqired for this heating depends merely on the apparatus used for this purpose, the only requirement being that the entire mass of oxide be raised to the aforementioned temperature. In order to insure uniform heating to this extent, we have found it advisable to heat the oxide mass to a measured temperature of 700° C. Heating to 800° C. is no more effective than 700° C. but may be used if desired to insure more complete removal of volatile components of the activator compound. These volatile components are, for example, zinc chloride when the activator is aluminum chloride, nitrous oxide when the activator is a nitrate, sulfur dioxide when the activator is a sulfate, carbon dioxide when the activator is an acetate or formate, etc. The removal of these volatile materials appears to improve the effectiveness of the final activation operation and simplifies this operation which, unlike the air-heating step, must be carried out in a closed vessel in order to maintain the necessary reducing atmosphere. In addition, the air-heating of the activator-containing oxide appears to increase the uniformity of dissemination of activator throughout the oxide and thus contributes treatment.

An additional advantageous effect of the step of heating the activator-containing zinc oxide in air prior to the activation heat-treatment in a reducing atmosphere is that most of the grain growth and agglomeration which takes place during the course of the ultimate activation of the oxide appears to take place during the air-heating step. These agglomerates and some enlarged grains can be broken up by mechanical disintegration at the end ot the air-heating step without adversely affecting the degree of conductivity ultimately obtained by the activated oxide. On the other hand, we have found that similar mechanical disintegration following the activation heat-treatment in the reducing atmosphere markedly lowers the conductivity of the oxide.

The mechanical disintegration of the air-heated activator-containing zinc oxide may be carried out in any conventional apparatus. Such a device is required only to break up agglomerates; a significant amount of grinding of the pigment in such a device is neither required nor desired. Thus, we have found that excellent results are obtained with a hammermill or fluid energy mill which disintegrates the agglomerates by mechanical impact rather than by grinding action.

The final activation heating must be done in a reducing atmosphere. A mixture of 5% hydrogen with 95% nitrogen is currently used as it is effective without being dangerously explosive if mixed with air, but concentrations up to 100% hydrogen have been used with satisfactory results. Other reducing gases such as carbon monoxide and the products of incomplete combustion of propane have also given good results.

The temperature of the reducing gas activation treatment controls the conductivity of the final pigment to some extent, with the highest temperatures giving best results. However, satisfactory conductivity results from an 800° C. heat treatment, whereas higher temperatures up to about 1000° C. although effective nevertheless cause some aggregation and undesirable particle size growth. The length of this heat treatment is not per se important; the only time requirement is that it be sufficient to raise the entire mass of oxide to a temperature of about 800° C. It is advantageous, however, to maintain the heat treatment for a sufficient period of time to insure uniformity of activation of the oxide, all as is well understood in this art. Following completion of this activation treatment, the hot oxide should be cooled to at least 200° C., and preferably to about 100° C., in the reducing or other non-oxidizing atmosphere, before exposing it to the ambient atmosphere.

The following examples are illustrative of the practice of our invention and show the effectiveness of not only the air-heating step but of the mechanical disintegration step which follows the air-heating but precedes the activation-heating operation. In each of these tests, the conductivity of the treated oxide was determined by a dry powder test (DPR) in which a plug of dry zinc oxide was compressed at 2600 p.s.i. in a glass tube having a bore area of 0.0452 square inch. The length of the plug was measured and its electrical resistance was also measured at a potential of 1 volt while maintaining the plug under a compression pressure of 2000 p.s.i. at room temperature. In this test, untreated zinc oxide (i.e. normally non-conductive oxide) exhibits an electrical resistivity of $10^7$ to $10^9$ ohm-centimeter. A resistivity of $10^4$ ohm-centimeter is considered a satisfactory indication of the electrical conductivity of the oxide.

*Example I*

Twenty-five pounds of French Process pigment zinc oxide were sprayed with a solution containing 505 grams of $AlCl_3.6H_2O$ dissolved in 0.5 liter of water. This amount of aluminum chloride activator corresponds to 0.5% aluminum based on the weight of the zinc oxide. The activator-containing pigment was heated to 650° to 700° C. in air, was cooled and was mechanically disintegrated by passing it through a hammermill. This disintegrated product was heated to a temperature of about 800° C. in a stainless steel retort in an atmosphere composed of 5% hydrogen and 95% nitrogen by volume and was cooled in this atmosphere. The product had an electrical resistivity of $7.8 \times 10^2$ ohm-cm. by the DPR test and therefore was rated as satisfactorily conductive.

*Example II*

When a portion of the same aluminum chloride-containing zinc oxide used in Example I was similarly processed except that it was not passed through a hammermill, the electrical resistivity of the product was $3.6 \times 10^5$ ohm-cm. and therefore was not satisfactory as a conductive oxide.

*Example III*

When the product from Example II was passed through the hammermill after the reducing gas treatment, its electrical resistivity was further increased to $1.2 \times 10^6$ ohm-cm.

*Example IV*

Sixty pounds of French Process pigment zinc oxide were sprayed with a solution of 728 grams of $AlCl_3.6H_2O$ dissolved in 900 cc. of water. Since this salt contained 11.2% aluminum, the treatment added 0.3% aluminum to the weight of the zinc oxide. The activator-sprayed oxide was then heated in air to 700° C., was cooled to facilitate handling, and was then passed through the hammermill. The resulting disintegrated oxide was heated in a stainless steel retort in an atmosphere composed of 5% hydrogen and 95% nitrogen by volume at a temperature of 800° C. for one hour and was cooled to about room temperature in this atmosphere. The final product had an electrical resistivity of $2.7 \times 10^3$ ohm-cm. and was therefore a satisfactorily conductive zinc oxide.

We claim:

1. In the method of producing electrically conductive zinc oxide wherein an activating agent comprising aluminum chloride is added to normally non-conductive zinc oxide and the activator-containing oxide is heated in a reducing atmosphere to a temperature of at least about 800° C. with resulting increase in its conductivity the improvement which comprises first heating the activator-containing non-conductive zinc oxide in the ambient atmosphere to a temperature of at least about 650° C., subjecting this air-heated oxide to mechanical disintegration wherein any agglomerates are broken, and thereafter subjecting the disintegrated oxide to the aforementioned heat treatment in the reducing atmosphere.

2. In the method of producing electrically conductive zinc oxide wherein an activating agent comprising aluminum chloride is added to normally non-conductive zinc oxide and the activator-containing oxide is heated in a reducing atmosphere to a temperature of at least about 800° C. with resulting increase in its conductivity, the improvement which comprises first heating the activator-containing non-conductive zinc oxide in the ambient atmosphere to a temperature of about 700° C., subjecting this air-heated oxide to mechanical disintegration wherein any agglomerates are broken, and thereafter subjecting the disintegrated oxide to the aforementioned heat treatment in the reducing atmosphere.

References Cited in the file of this patent

UNITED STATES PATENTS

| | | |
|---|---|---|
| 2,147,379 | Pearlman | Feb. 14, 1939 |
| 2,585,461 | Hirsch | Feb. 12, 1952 |
| 2,887,632 | Dalton | May 19, 1959 |

UNITED STATES PATENT OFFICE
CERTIFICATE OF CORRECTION

Patent No. 3,089,856　　　　　　　　　　　　　　May 14, 1963

Howard M. Cyr et al.

It is hereby certified that error appears in the above numbered patent requiring correction and that the said Letters Patent should read as corrected below.

Column 2, line 23, for "reuqired" read -- required --; line 44, after "contributes" insert -- to increased effectiveness of the final activation heat --.

Signed and sealed this 3rd day of December 1963.

(SEAL)
Attest:

ERNEST W. SWIDER

Attesting Officer

EDWIN L. REYNOLDS

Acting Commissioner of Patents